(12) United States Patent
Erdman et al.

(10) Patent No.: US 6,957,748 B1
(45) Date of Patent: Oct. 25, 2005

(54) VISCOUS FLUID METERING DEVICE WITH QUICK CHANGE NOZZLE

(75) Inventors: Rodney V. Erdman, Princeton, MN (US); Eric J. Berns, Elk River, MN (US)

(73) Assignee: Erdman Automation Corporation, Princeton, MN (US)

( * ) Notice: Subject to any disclaimer, the term of this patent is extended or adjusted under 35 U.S.C. 154(b) by 0 days.

(21) Appl. No.: 10/794,175

(22) Filed: Mar. 5, 2004

Related U.S. Application Data

(60) Provisional application No. 60/452,606, filed on Mar. 6, 2003, provisional application No. 60/454,275, filed on Mar. 13, 2003.

(51) Int. Cl.$^7$ ............................................. G01F 11/00
(52) U.S. Cl. ...................... 222/1; 222/146.5; 222/333; 222/567
(58) Field of Search .................... 222/1, 146.5, 153.09, 222/333, 367, 566, 567, 573

(56) References Cited

U.S. PATENT DOCUMENTS

| | | | |
|---|---|---|---|
| 4,634,024 A | | 1/1987 | Vollenweider |
| 4,714,425 A | | 11/1987 | Lenhardt |
| 5,290,600 A | * | 3/1994 | Ord et al. ................. 427/472 |
| 6,032,830 A | | 3/2000 | Brown |
| 6,234,355 B1 | | 5/2001 | Lenhardt |
| 6,257,444 B1 | * | 7/2001 | Everett ......................... 222/1 |
| 6,630,028 B2 | | 10/2003 | Briese et al. |
| 2003/0075563 A1 | * | 4/2003 | Bazzo et al. ............. 222/146.5 |
| 2003/0080153 A1 | * | 5/2003 | Saidman et al. ......... 222/146.5 |

OTHER PUBLICATIONS

Marketing Brochure, Glass Equipment Development, Inc., *Our Fully Integrated Line of IG Fabrication Machinery*, 2002, pp. 6.
Marketing Brochure, GRACO, Inc., *PrecisionFlo™ XL, Electronically Controlled Fluid Metering System*, 2001, pp. 15.

* cited by examiner

*Primary Examiner*—Joseph A. Kaufman
(74) *Attorney, Agent, or Firm*—Patterson, Thuente, Skaar & Christensen, P.A.

(57) ABSTRACT

A fouling resistant fluid dispensing assembly including a metering device and a nozzle assembly. The nozzle assembly generally includes a nozzle holder including a body defining a cylindrical bore. The nozzle has a cylindrical portion proportioned to be inserted into the cylindrical bore in a close fitting relationship. The nozzle holder is pierced by a passage oriented substantially perpendicular to the bore axis and passing through the cylindrical bore on a non-diametrical chord and the nozzle has a complementary passage that can be aligned with the nozzle holder passage. Once the holder passage and the nozzle passage are aligned, a retaining member proportioned to pass through the nozzle holder passage and the nozzle passage retains the nozzle in the cylindrical bore. The fluid dispensing assembly further includes a floating head and a mass distribution to maintain a viscous fluid at a desired temperature.

16 Claims, 11 Drawing Sheets

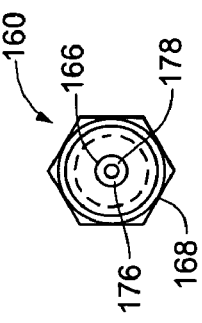
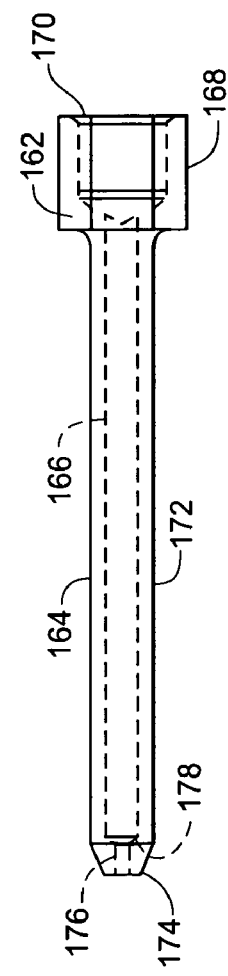
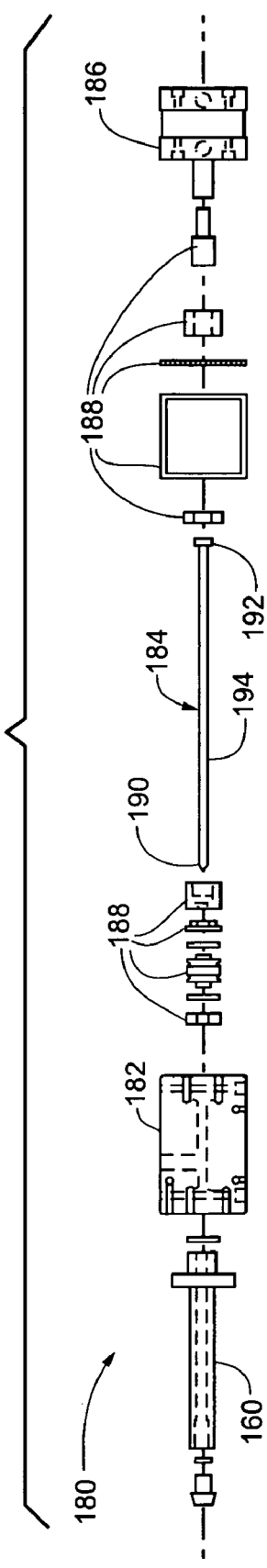

VISCOUS FLUID METERING DEVICE WITH QUICK CHANGE NOZZLE

CLAIM TO PRIORITY

This application claims priority to U.S. Provisional Application Ser. Nos. 60/452,606 entitled "Quick Change Nozzle" filed Mar. 6, 2003 and 60/454,275 entitled "Gear Pump Case" filed Mar. 13, 2003, the entire contents of which are incorporated herein by this reference.

RELATED APPLICATIONS

This application is related to U.S. Provisional Application Ser. No. 60/452,209 filed Mar. 5, 2003 entitled "System and Process for Glazing Glass to Windows and Door Frames" and to Utility Application filed on Mar. 5, 2004, with the same title, the entire contents of which are incorporated herein by this reference.

FIELD OF THE INVENTION

This invention relates to dispensing viscous fluids prone to hardening, such as sealants, and more particularly relates to a metering device and nozzle for dispensing viscous fluids.

BACKGROUND OF THE INVENTION

One of the biggest challenges in delivering viscous fluid is providing a uniform, metered flow of viscous material in applications where an interruption of the flow rate or consistency of the material delivered may lead to an unacceptable product with no avenue for remediation.

A major deficiency in the prior art metering devices is fluid leaking into the interstices between the working components of the metering device. This leakage induces a deviation in operational parameters and deterioration in the viscous fluid flow.

In addition, the ability to rapidly couple a nozzle to a nozzle holder body and lock it in place is an important capability, for instance, in window manufacturing machines. When dispensing viscous adhesive fluid nozzles tend to clog, foul and become coated with the fluid readily. There is no cure for this problem other than to clean the nozzle or to replace it. Once the viscous fluid begins to set or harden on or in the nozzle cleaning becomes very difficult. Generally, it is more economical to discard the nozzle and to replace with a new one. Depending on the material dispensed nozzles may require changing many times during a work shift. A typical nozzle assembly includes a female part in the form of a nozzle holder and a male part in the form of a nozzle; the reverse situation is possible as well. The female nozzle holder is connected to metering device and the metering device is connected to a fluid source, such as a tank containing sealant used in window manufacturing operations.

Quick coupling devices for making a leak resistant connection between hydraulic or pneumatic components such as hoses, valves and fluid dispensing nozzles are known in the art. In a fluid dispensing environment, where the fluid dispensed is viscous and adhesive in nature, it tends to clog the nozzle apertures and gum up, adhere to and foul the associated machinery. For example, many standard fluid dispensing nozzles use a threaded connection for attachment to a nozzle holder or a fluid source. The threaded connections can gum up and stick if adhesive or viscous fluid finds its way into the threads. This can lead to the threaded fittings being difficult or impossible to disassemble, thereby significantly increasing the time required to connect and disconnect the nozzles from the dispensing machinery.

The utility of quick coupling nozzles is substantially reduced in applications where viscous adhesive fluids are used and where nozzles need to be changed frequently, often within a single assembly cycle. It is difficult to repeatedly and precisely position a nozzle secured by threaded connections to dispense fluid in a preferred direction as is often required in window assembly operations. Threaded connections, by their nature, rotate.

Beside threaded connections, some prior art quick disconnect nozzle assemblies require twisting and interlocking with appendages on the nozzle holder or the nozzle to hold and align the nozzle tip into a nozzle holder. Some other prior art assemblies use mechanisms with slides, ball bearings, levers and pivots to lock and position components of the nozzle assembly. These assemblies require complex manufacturing and assembly operations adding to their cost. In addition, their reliability in the field may be poor when used with viscous adhesive fluids because fluids readily infiltrate into and among the moving parts. The complex moving parts then tend to become fouled by contact with the viscous adhesive fluids.

One requirement of nozzle assemblies is a fluid tight connection between the nozzle holder or fluid dispenser and the nozzle tip. This seal must be effective but additionally must be robust enough to withstand repeated connection and disconnection operations. Prior art quick disconnect nozzle assemblies with complicated seals are not practical especially if they are inaccessible, require special seating, are coated with and gummed up by the viscous liquid used in the operations and are to be inspected and replaced often. It will be apparent to those skilled in the art that this would significantly add to the cycle time and cost of manufacturing operations.

Traditionally sealant applied to insulated glass window units have been silicone-based sealants. Silicone-based sealants require a curing time between several hours and several days before they achieve substantial strength. This has led to the need for large storage facilities in the window and door manufacturing industry in order to allow finished units to set for a sufficient period of time to achieve substantial curing of the sealants. Thus, recently there has been a move to change over to hot dispensed sealants. The hot applied sealants and adhesives reduce the need to store completed window and door units while the sealant cures thus reducing overhead and the overall cost of producing windows and doors.

However, hot applied sealant materials tend to have high levels of abrasives and corrosive components. Hot applied sealants include substantial concentrations of silicas and other abrasive materials. Thus, the use of hot applied sealants increases the level of wear on mechanical components used to dispense them.

SUMMARY OF THE INVENTION

It is desirable to provide a metering device that will perform consistently over an extended period of time, delivering a uniform controlled flow of viscous sealant. It is desirable that the nozzle be quickly connectable to and rapidly releasable from the nozzle holder. The ease of replacement of a nozzle can significantly affect machine utilization.

In some applications, it is highly desirable that a nozzle be precisely positioned in the same orientation time after time. One skilled in the art will readily appreciate the value of having a nozzle that could be replaced quickly with precise repeatability of position.

It would be desirable to have a durable metering device that has minimal leakage and a quick disconnect nozzle assembly that can be rapidly connected and disconnected and fitted onto the nozzle holder manually without the use of a tools. Preferably the nozzle assembly should provide a leak-proof connection with the fluid source that can be easily positioned in a preferred orientation. The assembly should be easily inspected, have few moving parts and easily replaceable sealing members. In addition, the nozzle assembly should allow for repeatable positioning of the nozzle.

A further problem encountered with hot applied sealants is when they are subjected to high pressures, solids in the hot applied sealant mix will tend to come out of suspension. Thus it becomes important to limit the highest pressure in the system to a level lower than that at which the solids will come out of suspension. For example, if a hot applied sealant material can only be subjected to a maximum pressure of 2,500 psi and there is a pressure loss passing through the passageways of the system of 1,000 psi, this can create a major problem in maintaining high enough levels of pressure in the lowest pressure areas of the system while keeping high pressure areas below the critical pressure.

Another trend seen in the adhesives industry is toward the use of two part catalyzed sealants. Two part catalyzed sealants also include high levels of abrasive and corrosive components. These qualities accelerate wear on dispensing system components. Thus, both durability and ease of maintenance are important qualities for equipment used to dispense these types of sealants.

While it is desirable, in hot applied sealant systems, to maintain the fluid passage ways at a high temperature in order keep the sealants fluid, it is undesirable to expose mechanical components such as servo motors, gear boxes and actuators to high temperatures. Exposing these components to elevated temperatures tends to accelerate wear and increase the likelihood of early component failure.

The present invention solves many of the above problems by providing a robust gear metering device and an easily changeable nozzle and holder assembly.

The fouling resistant fluid dispensing assembly of the invention includes a metering device and a nozzle assembly. The nozzle assembly generally includes a nozzle holder including a body defining a substantially cylindrical bore. The nozzle has a cylindrical portion proportioned to be inserted into the cylindrical bore in a close fitting relationship. The nozzle holder is pierced by a passage oriented substantially perpendicular to the bore axis and passing through the cylindrical bore on a non-diametrical chord and the nozzle has a complementary passage that can be aligned with the nozzle holder passage. Once the holder passage and the nozzle passage are aligned, a retaining member proportioned to pass through the nozzle holder passage and the nozzle passage retains the nozzle in the cylindrical bore.

The invention includes a gear metering device suited to delivering viscous fluids such as sealants and desiccants used in the window manufacturing industry. The metering device includes a gear metering device chamber enclosed within metering device body assembly and transfers fluid under pressure to the outlet of the metering device. A significant feature of the present invention is that the surface finish of the gear teeth and clearances between gear teeth and the walls of the metering chamber are held to tight tolerances so that pressure generated by the motion of the gears is not dissipated through leak paths in the metering chamber. Another significant feature of the present invention is the use of materials of construction and seals uniquely adapted to resist deterioration under contact with the abrasive and caustic chemicals in sealants.

The invention also includes a method of producing the metering device to the close tolerances desired to minimize bypass leakage and predictably meter sealant fluids. Further the invention includes a hydraulic lock bypass port to prevent hydraulic lock between the gear teeth in order to maintain low leakage tolerances.

The invention also includes a nozzle assembly capable of quick assembly and disassembly. The device comprises a nozzle holder, one end of which is coupled to the metering device or another source of fluid, such as a sealant or desiccant, under pressure and the other end of which is adapted to axially and slidably receive a first end of a nozzle. The second end of the nozzle includes a nozzle outlet from which the fluid is dispensed.

The nozzle has a resilient sealing member to provide a fluid-tight seal between the nozzle holder and the body of the nozzle downstream of the sealing member. The sealing member permits rotational and sliding degrees of freedom of the nozzle with respect to the nozzle holder. Desirably the sealing member is an O-ring captured in groove on the nozzle or the holder.

The nozzle holder has a chordal bore extending transverse to the nozzle axis and the nozzle has a mating chordal groove on its periphery downstream of the sealing member. In the context of this application, the term chordal refers to following the chord of a circle. When the nozzle is fully inserted into the nozzle holder body, the nozzle is rotated so that the chordal bore aligns with the chordal groove on the nozzle. A retaining pin is inserted through the chordal bore so as to extend transversely across the nozzle holder and to pass through the groove. The retaining pin fits into and seats in the chordal groove so as to axially and rotationally secure the nozzle in the nozzle holder.

BRIEF DESCRIPTION OF THE DRAWINGS

The invention may be more completely understood in consideration of the following detailed description of various embodiments of the invention in connection with the accompanying drawings, in which:

FIG. 8 is a front view of a quick-change nozzle and nozzle holder assembly exemplifying a second embodiment of the present invention.

FIG. 9 is a side view of a quick-change nozzle assembly.

FIG. 10 is an exploded view illustrating another embodiment of the present invention.

FIG. 19b is a plan view of the valve block depicted in FIG. 19a.

Figure 1:
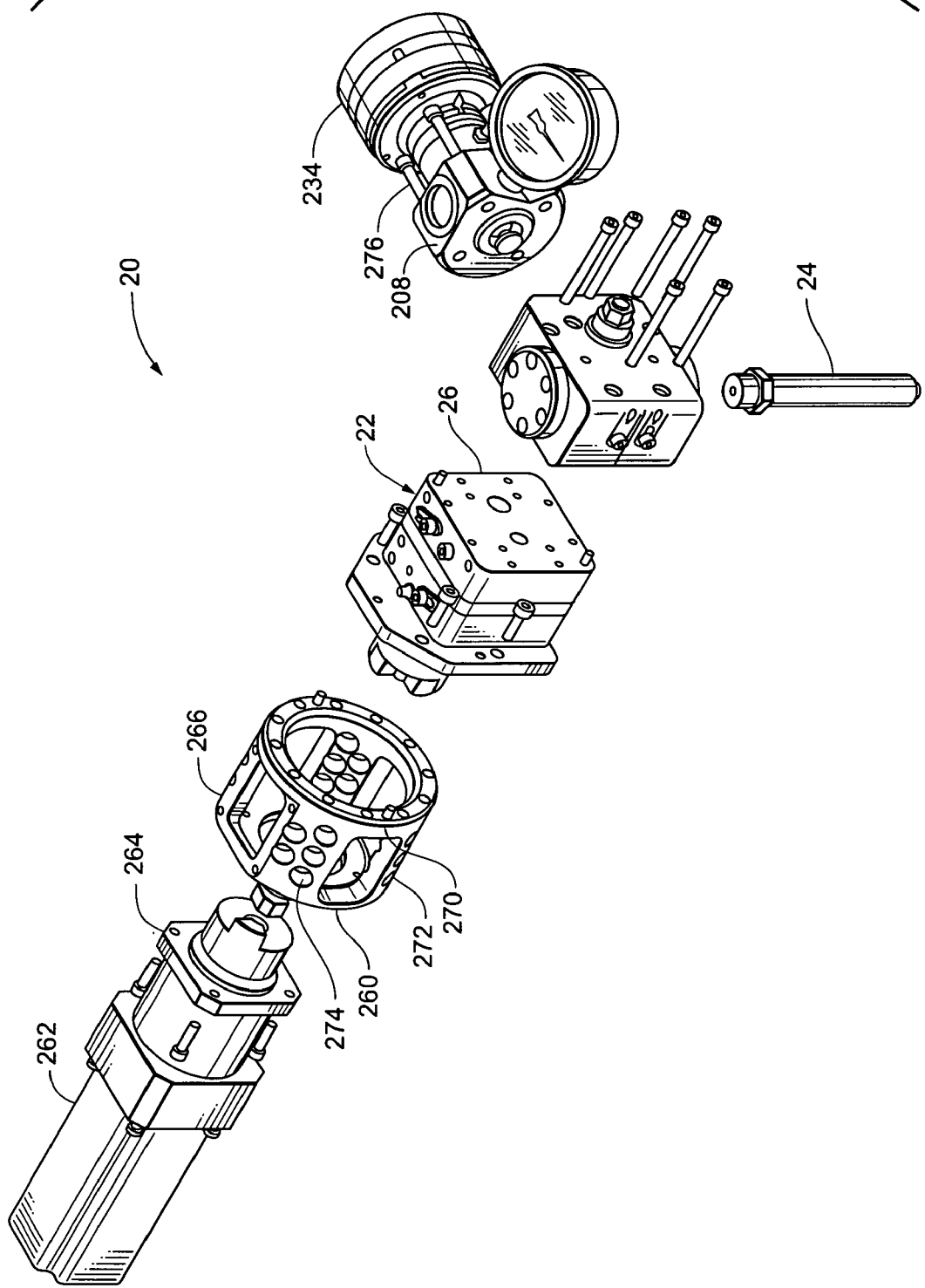
FIG. 1 is a partially exploded perspective view of a gear metering device and quick-change nozzle in accordance with the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE INVENTION

Referring to FIG. 1, viscous liquid dispenser 20 generally includes a metering device 22 and a nozzle assembly 24. Metering device 22 is in fluid communication with nozzle assembly 24 so that viscous liquid material that leaves metering device 22 flows to and, ultimately through nozzle assembly 24. The metering device 22 generally includes metering device body 26 and gear assembly 28. Gear assembly 28 is enclosed within and surrounded by metering device body 26.

Figure 2:
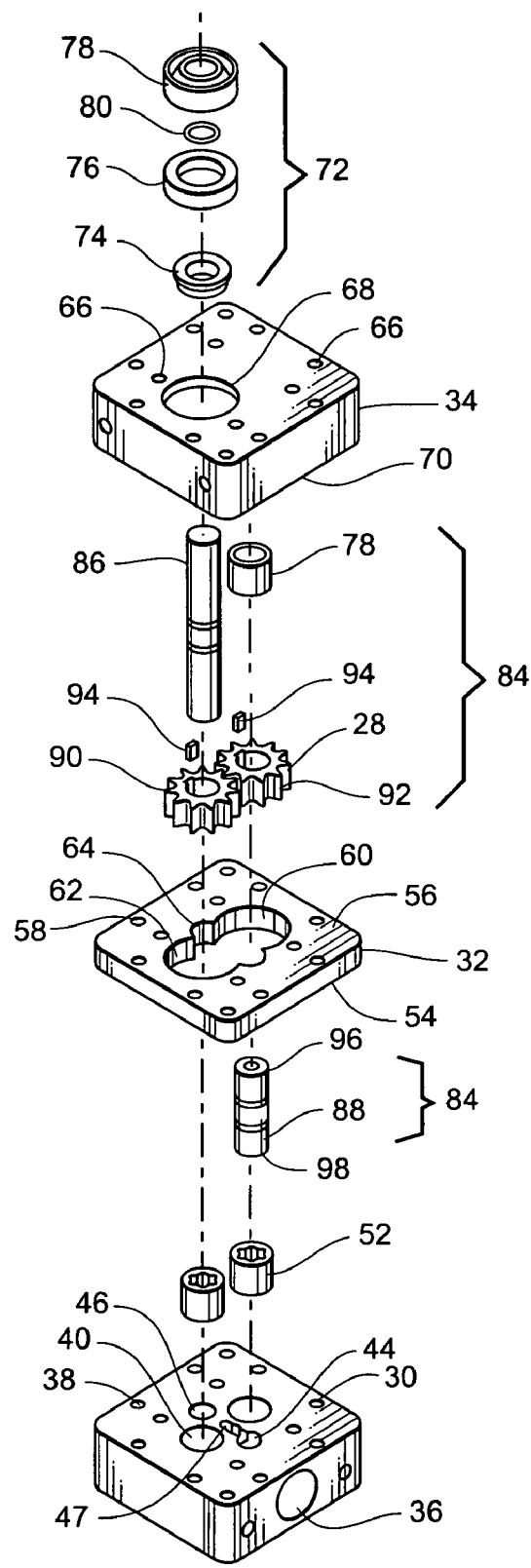
FIG. 2 is an exploded view of the gear metering device in accordance with the present invention.
Figure 20:
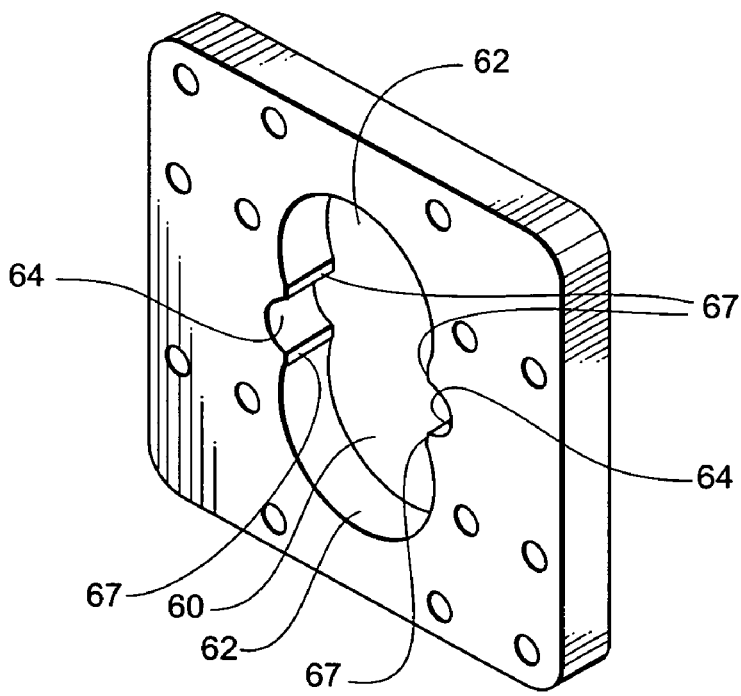
FIG. 20 is a perspective view of a center plate of the gear metering device of the present invention.
Figure 21:
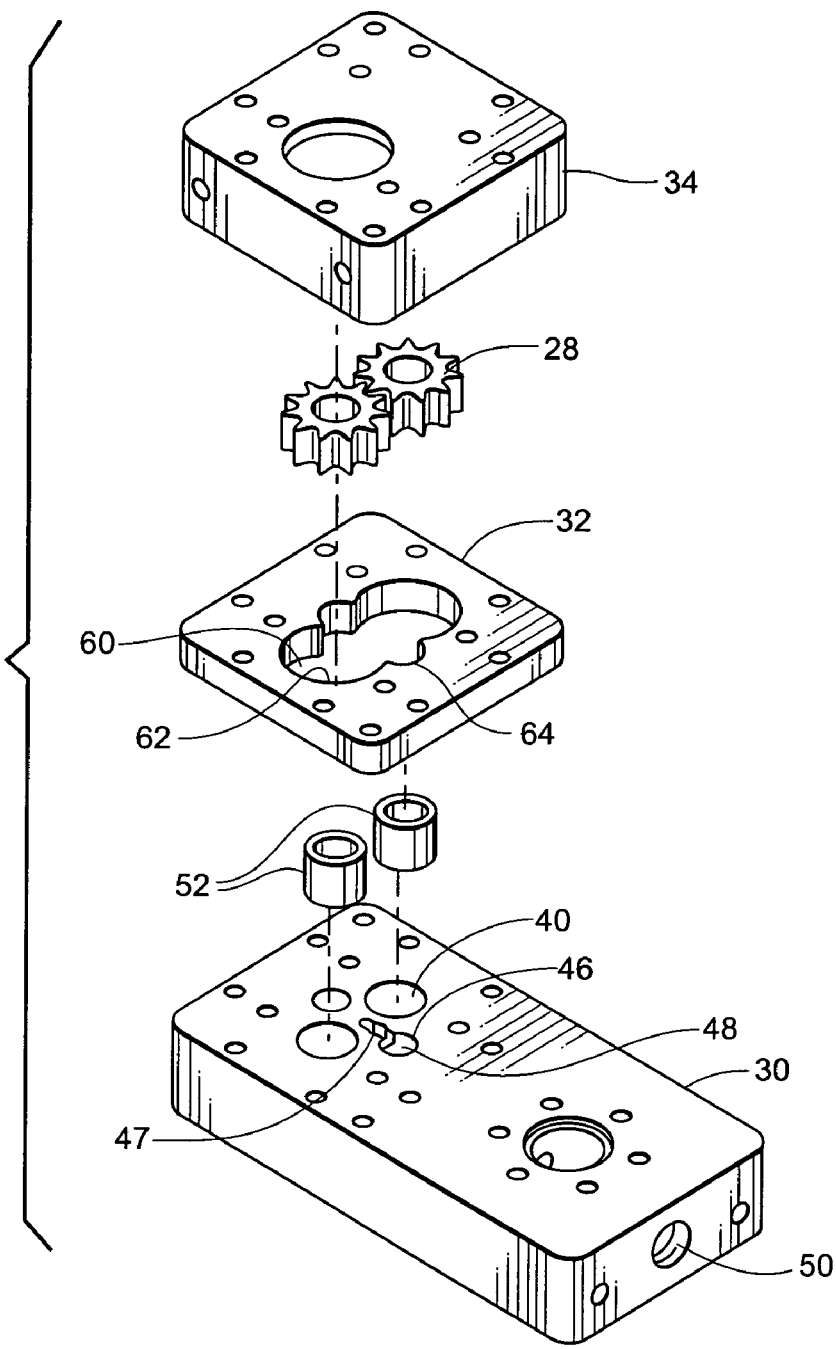
FIG. 21 is an exploded perspective view of the gear metering device with some parts removed for clarity.

Referring to FIGS. 2, 20 and 21, metering device body 26 is generally divided into three major subcomponents, port plate 30, center plate 32 and drive plate 34. Each of port plate 30, center plate 32 and drive plate 34 have a plurality of passageways, apertures and cavities machined or otherwise formed in them.

Port plate 30 defines inlet 36, a plurality of boltholes 38 and bearing cavities 40. Inlet 36 leads to inlet passage 42 which terminates at interior inlet 44. Thus, inlet passage 42 provides for fluid communication between inlet 36 and interior inlet 44. Port plate 30 further defines interior outlet 36 which leads to outlet passage 48 and then to outlet 50. Outlet passage 48 provides for fluid communication between interior outlet 46 and outlet 50. Desirably inlet 36 and outlet 50 are threaded or otherwise adapted to receive fittings to connect them to hoses or other fluid transfer devices. Note that interior outlet 46 is shaped to include extended lobe 47 that extends toward the center of port plate 30 and is in fluid communication with outlet passage 48.

Bearing cavities 40 are desirably machined into port plate 30 and are sized and appropriately shaped to receive and support bearings 52.

Center plate 32 is a generally flat quadrilateral structure whose first surface 54 and second surface 56 are ground flat to mate with port plate 30 and drive plate 34, respectively. Center plate 32 defines a plurality of boltholes 58 arranged in a pattern similar to bolt holes 38. Center plate 32 also defines gear chamber 60. Gear chamber 60 creates a multi-lobed cavity bordered by center plate 32 at its perimeter and by port plate 30 and drive plate 34 on each side. Gear chamber 60 is defined by the envelope of two intersecting major circular lobes 62 and two minor lobes 64. Minor lobes 64 are located, generally, at the points of intersection of the circumference of each of the major circular lobes 62. Minor lobes 64 generally correspond with the locations of interior inlet 44 and interior outlet 46 which are located symmetrically on opposite sides of gear chamber 60. Note that the junctures 67 where major circular lobes 62 and minor lobes 64 meet are desirably slightly rounded or otherwise shaped to avoid a sharp corner. Particularly, it is desirable to machine a small flat at junctures 67 between major circular lobes 62 and minor lobes 64 as depicted in FIG. 20.

Drive plate 34 corresponds in external perimeter shape to port plate 30 and center plate 32. Drive plate 34 defines a plurality of boltholes 66 located in a pattern corresponding to bolt holes 38 and bolt holes 58. Drive plate 34 also defines shaft passage 68 and bearing cavity 70. Shaft passage 68 is a cylindrical bore passing all the way through drive plate 34. Shaft passage 68 is adapted to receive sealed bearing assembly 72. Sealed bearing assembly 72 includes vari-seal 74, seal spacer 76, bearing 78 and snap ring 80. Bearing cavity 70 is a cylindrical cavity adapted to receive bearing 82.

Gear metering device assembly 84 fits into gear chamber 60. Gear metering device assembly 84 includes drive shaft 86, idler shaft 88, drive gear 90 and driven gear 92. Drive gear 90 is secured to drive shaft 86. Driven gear 92 is secured to idler shaft 88. Drive gear 90 and driven gear 92 are secured to drive shaft 86 and idler shaft 88, respectively by keys 94. Drive shaft 86 passes through sealed bearing assembly 72 and is journaled into bearings 52 which are supported by port plate 30. Idler shaft 88 is journaled into bearing 78 at a first end 96 and into bearing 52 at a second end 98.

Drive gear 90 and driven gear 92 are ground to be precisely flat and so as to have a thickness precisely equal to the thickness of center plate 32. In grinding drive gear 90 and driven gear 92 it is desirable to eliminate radiused edges so that the sides of drive gear 90 and driven gear 92 are as flat as practical. Drive gear 90 and driven gear 92 should have a maximum edge break of 0.002 inches.

In addition, drive gear 90 and driven gear 92 are placed on an arbor and trued to eliminate as much runout as practical. The diameter of drive gear 90 and driven gear 92 is reduced to be the same as or slightly larger than the diameter of major circular lobes 62. Drive gear 90 and driven gear 92 are then press fit into their corresponding spaces in major circular lobes 62 and lapped in to precise fit thus providing an extremely tight seal between the perimeters of drive gear 90 and driven gear 92 and the walls of major circular lobes 62 along the entire circumference of major circular lobes 62 as well as between drive gear 90 and driven gear 92 and drive plate 34 and port plate 30.

Thus, when located in gear chamber 60, drive gear 90 is meshed with driven gear 92 so that when drive shaft 86 is rotated, drive shaft 86 rotates drive gear 90 which in turn rotates driven gear 92 and idler shaft 88. This rotation allows fluid to be drawn in to gear chamber 60 from inlet passage 42 and to be released out of gear chamber 60 through outlet passage 48 thereby effectively transferring fluid from inlet 36 to outlet 50. Since a known volume of fluid is transferred with each rotation of gear metering device assembly 84 a precise amount of fluid can be delivered by counting rotations and fractions of rotations. Drive gear 90 and driven gear 92 mesh at a location directly overlying extended lobe 47. This allows the release of fluid caught between the teeth of drive gear 90 and driven gear 82 into outlet passage 48 thus preventing hydraulic lock caused by the entrapment of incompressible fluid between drive gear 90 and driven gear 92 by the extremely tight fit between drive gear 90 and driven gear 92 and port plate 30 and drive plate 34. Bearings 52, 78 and 82 serve only to keep drive shaft 86 and idler shaft 88 perpendicular so that lash in the bearings does not allow leaks.

Port plate 30, drive plate 34, drive shaft 86 and idler shaft 88, are constructed from D-2 tool hardened steel with a Rockwell hardness factor in the range of 58–62. The shafts are carried by bearings, such as, for example, Torrington needle bearings and Nice needle bearings and Nice DC TN bearings supplied by Motion. Drive gear 90 and driven gear 92 are desirably constructed from brass, aluminum or steel with close tolerances maintained between drive gear 90, driven gear 92 and the interior of gear chamber 60. Vari-seal 74 is desirably constructed of VITON or Teflon® such as that manufactured by Vari-seal. Nozzle assembly 24 generally includes nozzle holder 100 and nozzle 102.

Figure 3:
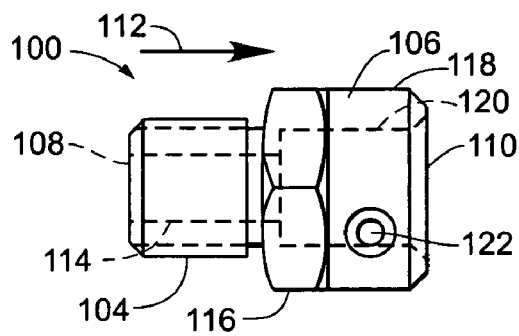
FIG. 3 is a front view of a quick-change nozzle holder body in accordance with the invention.
Figure 4:
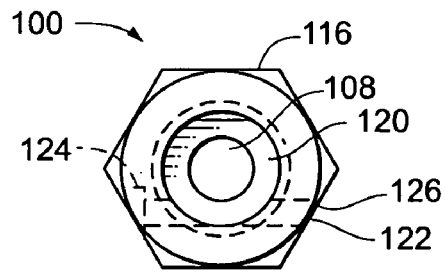
FIG. 4 is a side view of the quick change nozzle holder of FIG. 3.

Referring to FIGS. 3 and 4, nozzle holder 100 is formed preferably by machining from a solid block of material. Nozzle holder 100 defines an inlet portion 104 and an outlet portion 106. Inlet portion 104 is pierced by small bore 108. Outlet portion 102 is pierced by large bore 110. Small bore 108 and large bore 110 are preferably cylindrical and share a common axis. In other words, small bore 108 and large bore 110 are co-axial. Together small bore 108 and large bore 110 create a fluid communication passage completely through nozzle holder 100. Referring to FIG. 3, arrow 112 indicates the direction of fluid flow through nozzle holder 100.

Inlet portion 104 includes threads 114. Threads 114 as depicted in FIG. 3 are male threads, though one skilled in the art could readily adapt nozzle holder 100 for female threads.

Outlet portion 106 includes hexagonal portion 116 and external cylindrical portion 118. Hexagonal portion 116 is adapted to receive a standard wrench. Large bore 110 creates a cylindrical cavity 120 within outlet portion 106. Cylindrical cavity 120 is adapted to receive nozzle 102.

A pin bore 122 pierces external cylindrical portion 118. Pin bore 122 is located so as to pass through and intrude into cylindrical cavity 120 on a non-diametrical chord near the curved wall thereof. Pin bore 122 terminates at a first end with counterbored aperture 124 and at a second end with aperture 126. Desirably, as seen in FIGS. 3 and 4, pin bore 122 passes through cylindrical cavity 120 so that the wall of pin bore 122 is approximately tangential to the wall of cylindrical cavity 120. Pin bore 122 is adapted to receive a resilient pin 128. The resilient pin 128 is desirably a standard cotter pin but may be another form of pin or rod.

When resilient pin 128 is inserted through pin bore 122 it passes through cylindrical cavity 120 in a chord wise fashion partially blocking cylindrical cavity 120.

Figure 5:
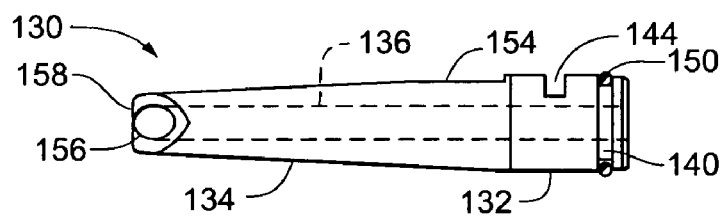
FIG. 5 is front view of a quick-change nozzle in accordance with the invention.
Figure 6:
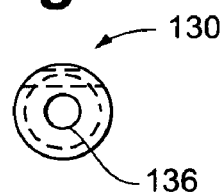
FIG. 6 is a top view of a quick-change nozzle.
Figure 7:
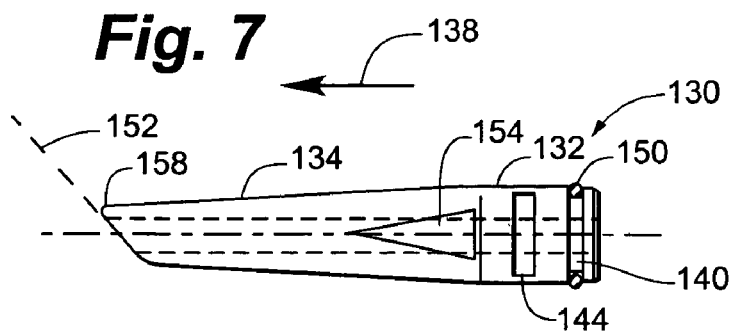
FIG. 7 is a side view of a quick-change nozzle.

FIGS. 5, 6 and 7 depict a first embodiment of nozzle 102. Conical nozzle 130 generally includes cylindrical portion 132 and frustoconical portion 134. Conical nozzle 130 is preferably formed of a single piece of material by machining, molding or any other process known in the art. A longitudinal bore 136 pierces conical nozzle 130. Arrow 138 demonstrates the direction of fluid flow through longitudinal bore 136.

Cylindrical portion 132 defines circumferential groove 140 and tangential groove 144. Circumferential groove 140 is located close to inlet end 146 of cylindrical portion 132. Circumferential groove 140 is adapted to receive a sealing member 148. Sealing member 148 is desirably an O-ring 150 but may be another form of gasket or seal. Also located at inlet end 146 of cylindrical portion 132 is bevel 152.

Tangential groove 144 is desirably located downstream from circumferential groove 140. Tangential groove 144 is located so that when cylindrical portion 132 is inserted into cylindrical cavity 120, tangential groove 144 may be aligned with pin bore 122 so that resilient pin 128 may be passed through pin bore 122 while also passing through tangential groove 144. Resilient pin 128 thus creates an interference with tangential groove 144 and holds nozzle 102 in nozzle holder 100. The location of O-ring 150 in circumferential groove 140 allows for rotational and sliding freedom of cylindrical portion 132 within cylindrical cavity 120 until resilient pin 128 is inserted through pin bore 122 and tangential groove 124. Upon insertion through pin bore 122, resilient pin 128 secures nozzle 102 in cylindrical cavity 120.

Referring particularly to FIGS. 5 and 6, frustoconical portion 134 of conical nozzle 130 defines flat 154. Flat 154 is desirably aligned with tangential groove 144 to provide an indication as to the position of tangential groove 144 when tangential groove 144 is inserted into cylindrical cavity 120 and thus hidden from view. Frustoconical portion 134 further defines a beveled end 156 with a smaller flattened end 158. Desirably, nozzle holder 100 is made of brass and nozzle 102 is made of a polymer such as DELRIN® manufactured by DuPont.

FIGS. 8 and 9 depict another embodiment of nozzle 102. Shut-off tip 160 generally includes mounting portion 162 and elongate portion 164. Fluid passage 166 passes entirely through shut-off tip 160 longitudinally.

Mounting portion 162 includes hex section 168 and threaded inlet 170. Threaded inlet 170 is internally threaded and adapted to be screwed on to a male fitting (not shown). Hex section 168 is adapted to receive a standard wrench to allow tightening onto a male fitting (not shown).

Elongate portion 164 includes cylindrical portion 172 and frustoconical portion 174. Cylindrical portion 172 is an essentially tubular structure surrounding fluid passage 166. Frustoconical portion 174 surrounds reduced fluid passage 176. Reduced fluid passage 176 passes through frustoconical portion 174 and is in fluid communication with fluid passage 166. Reduced fluid passage 176 is of smaller diameter than fluid passage 166. Juncture 178 is formed where fluid passage 166 and reduced fluid passage 176 meet. Juncture 178 desirably is internally frustoconical and acts as a valve seat adapted to receive a valve member (not shown).

FIG. 10 depicts an exemplary nozzle assembly 180 for use with shut off tip 160. Nozzle assembly 180 generally includes fluid supply block 182, shut off pin 184 and actuator 186. Fluid supply block 182 is joined to actuator 186 by a plurality of fittings 188. Shut off pin 184 includes a frustoconical pin tip 190, actuator head 192 and elongate body 194. Pin tip 190 is adapted to mate with juncture 178.

Actuator head 192 is adapted to be operably connected to actuator 186. Actuator 186 is adapted to advance or retract shut off pin 184 so that pin tip 190 engages or disengages from juncture 178, so as to prevent or allow fluid flow through shut off tip 160 as desired.

Figure 11:
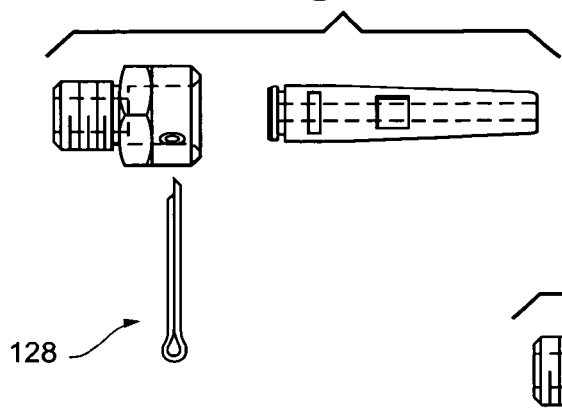
FIG. 11 is an exploded front view of another embodiment of the invention.
Figure 12:
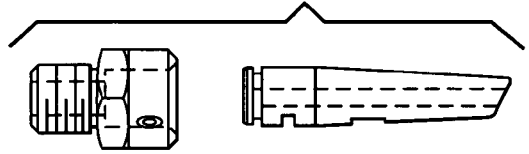
FIG. 12 is an exploded side view of the embodiment of FIG. 11.
Figure 13:
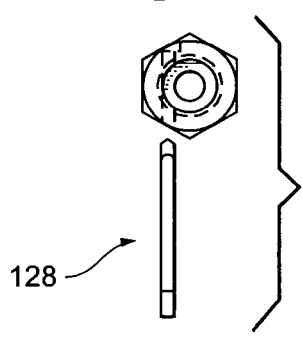
FIG. 13 is an exploded top view of the embodiment of FIG. 11.

FIGS. 11, 12 and 13 depict an exploded view of another embodiment of the invention. In this embodiment, nozzle holder 100 is substantially similar to that previously disclosed in FIGS. 3 and 4. In addition, cylindrical portion 196 is substantially similar to cylindrical portion 132 as previously described. In this embodiment, beveled end 156 is rotated ninety degrees from tangential groove 144.

Figure 14:
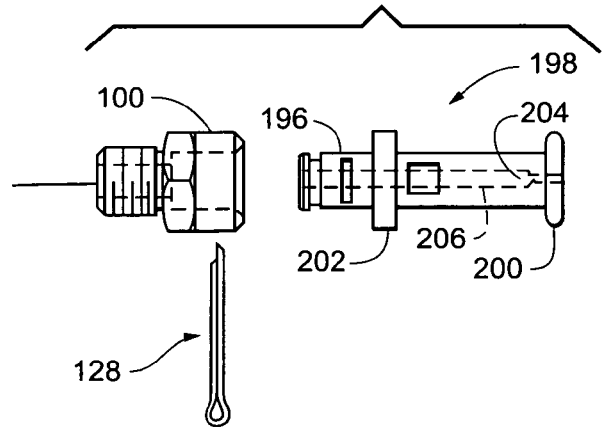
FIG. 14 is an exploded front view of another embodiment of the invention.
Figure 15:
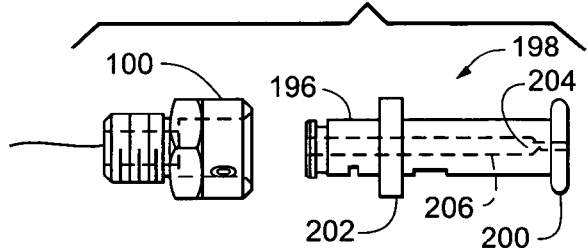
FIG. 15 is an exploded side view of the embodiment of FIG. 14.
Figure 16:
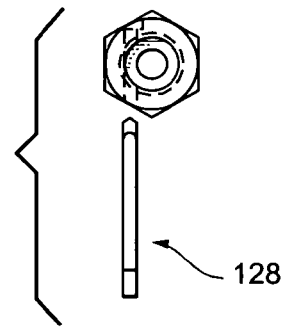
FIG. 16 is an exploded top view of the embodiment of FIG. 14.

FIGS. 14, 15 and 16 depict another embodiment of the invention. In this embodiment, nozzle holder 100 is substantially similar to that previously disclosed in FIGS. 3 and 4. In addition, cylindrical portion 196 is substantially similar to cylindrical portion 132 as previously described. Cylindrical nozzle 198 includes end plate 200 and mid plate 202. End plate 200 is a flat plate larger in diameter than cylindrical portion 196. In addition, outlet 204 exits generally through the center of circular end plate 200. Mid plate 202 is positioned to abut nozzle holder 100 and is larger in diameter than cylindrical portion 196.

In addition, bore 206 is structured similarly to the bore of shut off tip 160 so that a shut off pin 184 may be advanced into bore 206 in order to allow or prevent fluid flow therethrough.

Figure 17:
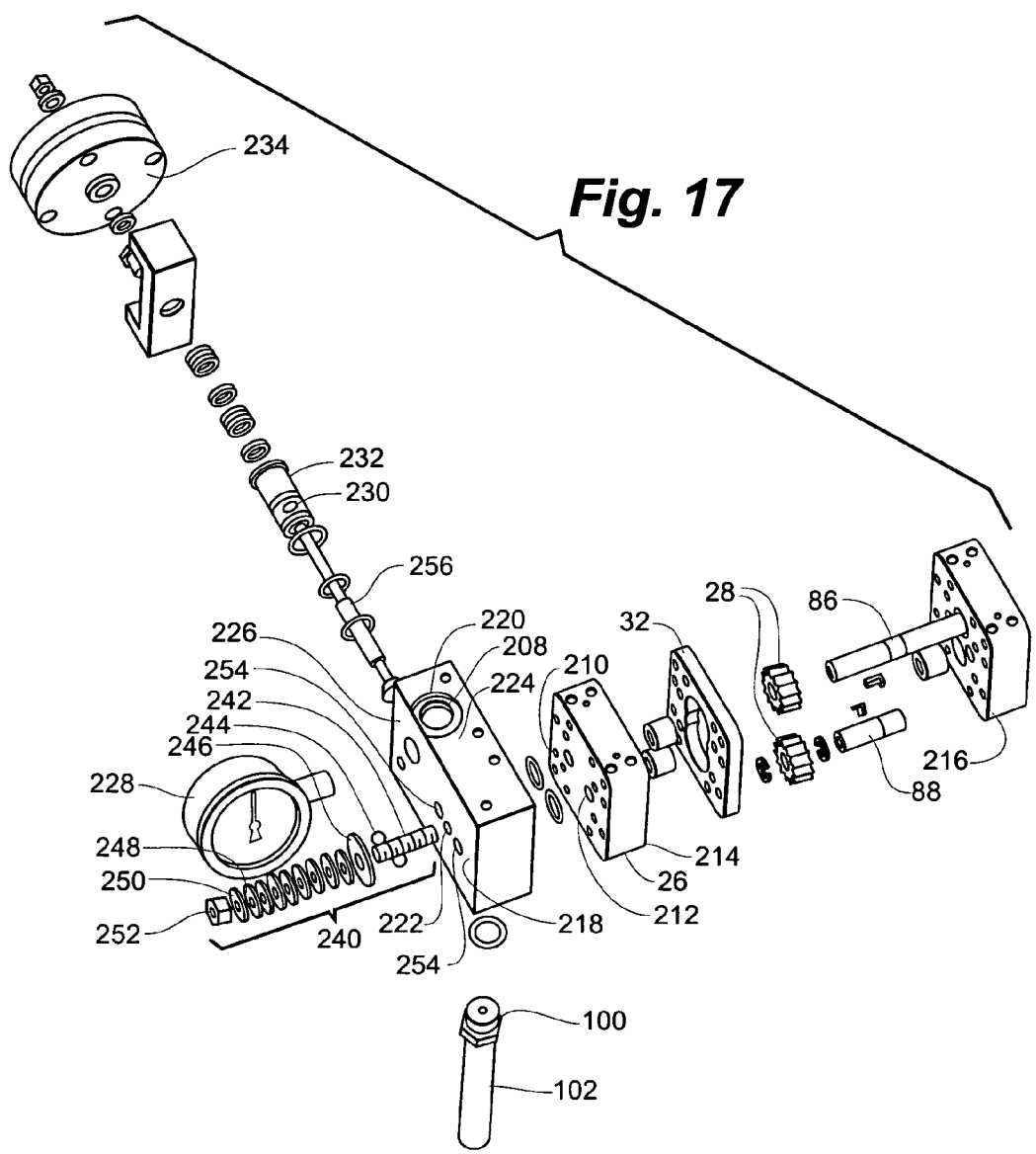
FIG. 17 is an exploded perspective view of a gear metering device, valve block and quick change nozzle in accordance with the present invention.
Figure 18:
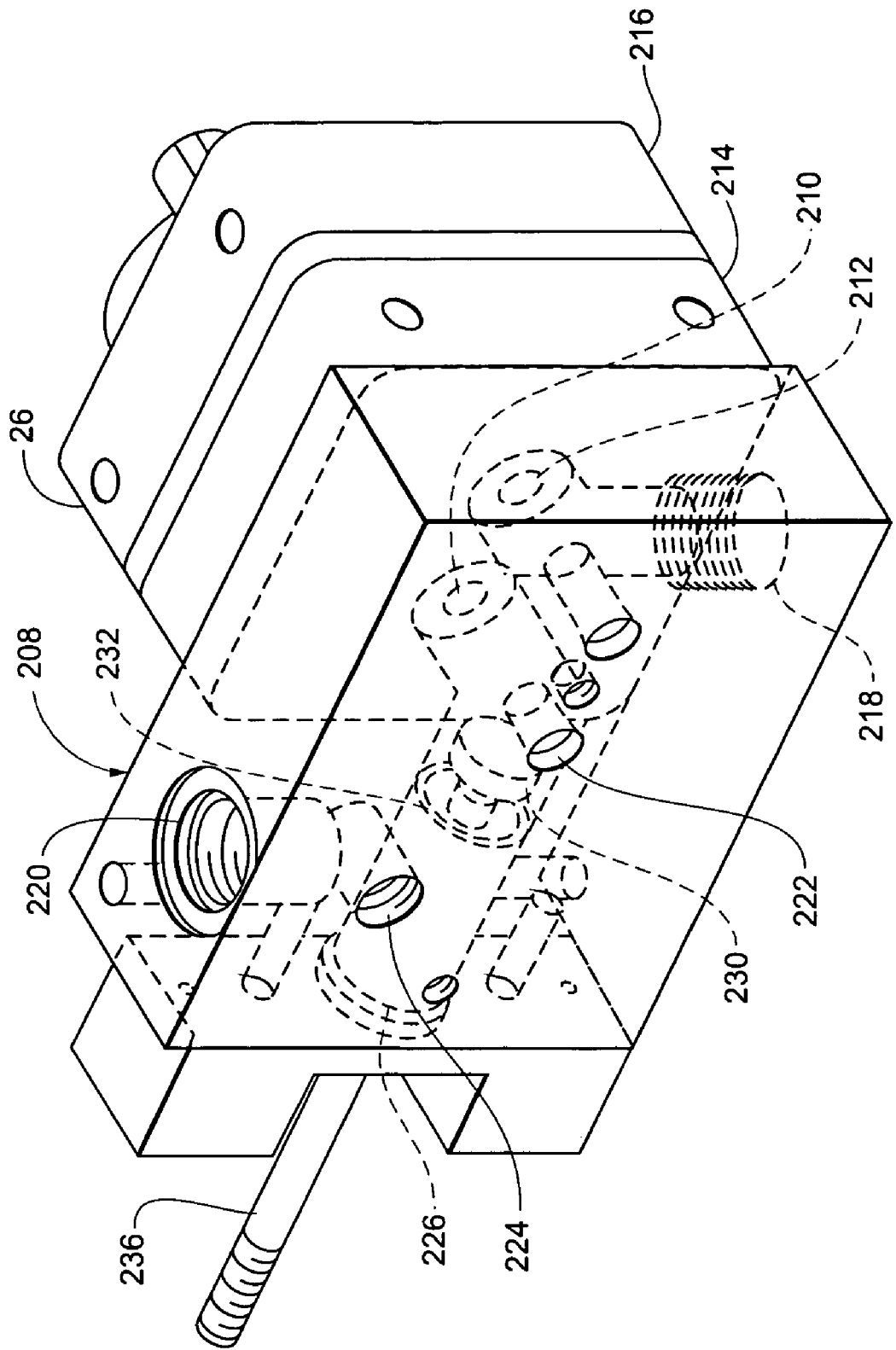
FIG. 18 is perspective view of a gear metering device and valve block with interior structures of the valve block depicted in phantom.

Referring to FIGS. 17 and 18, another embodiment of the invention is depicted. In this embodiment the viscous liquid dispenser 20 incorporates a valve block 208. In this embodiment valve block 208 is positioned directly adjacent to metering device body 26. To achieve this, metering device body 26 is ported so that inlet 210 and outlet 212 are both incorporated into port plate 214. Thus, drive plate 216 has no external fluid ports in this embodiment.

Valve block 208 defines a variety of ports and passageways. Valve block 208 is a generally rectilinear structure preferably machined out of a solid block of high strength material. Valve block defines nozzle port 218, hose input port 220, over pressure port 222, pressure meter port 224 and valve port 226. Nozzle port 218 is adapted to received nozzles 102 as described above.

Hose input port 220 is threaded or otherwise adapted to receive connection to a high pressure hose (not shown), which supplies viscous material to be metered. Hose input port 220 is in direct fluid communication with over pressure port 222, pressure meter port 224 and valve port 226. Pressure meter port 224 is adapted to receive a pressure meter 228, preferably of the bourdon, oil filled type. Thus, pressure meter 228 registers the pressure supplied to hose input port 220. Thus, hose input port 220, pressure meter port 224 and valve port 226 are all located on the upstream side of metering device 22. Nozzle port 218 is located on the downstream side of metering device 22, and over pressure port 222 is in fluid communication with both the upstream side and downstream side of metering device 22.

Valve port 226 is adapted to receive a poppet valve 230. Poppet valve 230 is pneumatically actuated and generally includes valve seat 232, pneumatic actuator 234 and plunger 236. Poppet valve 230 is desirably sealed by a plurality of O-rings but other seals may be used as well. Over pressure port 222 is adapted to relieve over pressure relief 240.

Over pressure relief 240 generally includes stud 242, two balls 244, fender washer 246, a plurality of Bellville washers 248, sandwiched between flat washers 250 and nut 252. Over pressure port 222 defines two cone shaped recesses 254, one in fluid communication with the upstream side of the valve block 208, and the other in communication with the downstream side of the valve block 208. Balls 244 are each seated in one of cone shaped recesses 254. Cone shaped recesses 254 straddle on either side of stud 242. Fender washer 246 bears upon balls 244 in order to bias them into cone shaped recesses 254. Fender washer 246 is then followed on stud 242 by a series of Bellville washers 248 interleaved with flat washers 250. The ultimate washer on stud 242 is a flat washer 250. The ultimate flat washer is followed by nut 252 which is tightened to bear upon the various washers and upon balls 244 in order to seal balls 244 into cone shaped recesses 254. When pressure within valve block 208 exceeds a predetermined value, Bellville washers 248 compress allowing the relief of over pressure through cone shaped recesses 254. This arrangement prevents the blowout of seals within valve block 208 in the event of an overpressure situation.

Thus, fluid flow through valve block 208 takes the following path. Fluid enters through hose input port 220. Hose input port 220 leads to valve port 208 where fluid meets valve plunger 236 when poppet valve 230 is in the closed position. Fluid also flows to pressure meter port 224 where pressure meter 228 provides a pressure reading. When poppet valve 230 is in the open position, fluid continues to flow through valve port 226, to inlet 210 of metering device 22. When metering device 22 turns to meter a desired quantity of viscous fluid, fluid continues to flow through outlet 212 and then to nozzle port 218. Over pressure port 222 includes flow to two cone shaped recesses 254. Fluid flow is generally prevented by the presence of balls 224 in cone shaped recesses 254. However, if fluid pressure exceeds the biasing force provided by Bellville washers 248 on fender washer 246, fluid may escape through cone shaped recesses 254 thus preventing damage to seals within valve block 208.

Figure 19A:
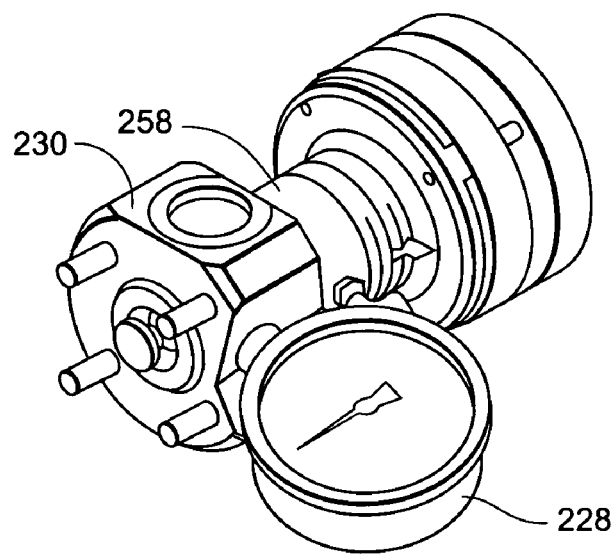
FIG. 19a is a perspective view of another embodiment of the valve block in accordance with the present invention.
Figure 19B:
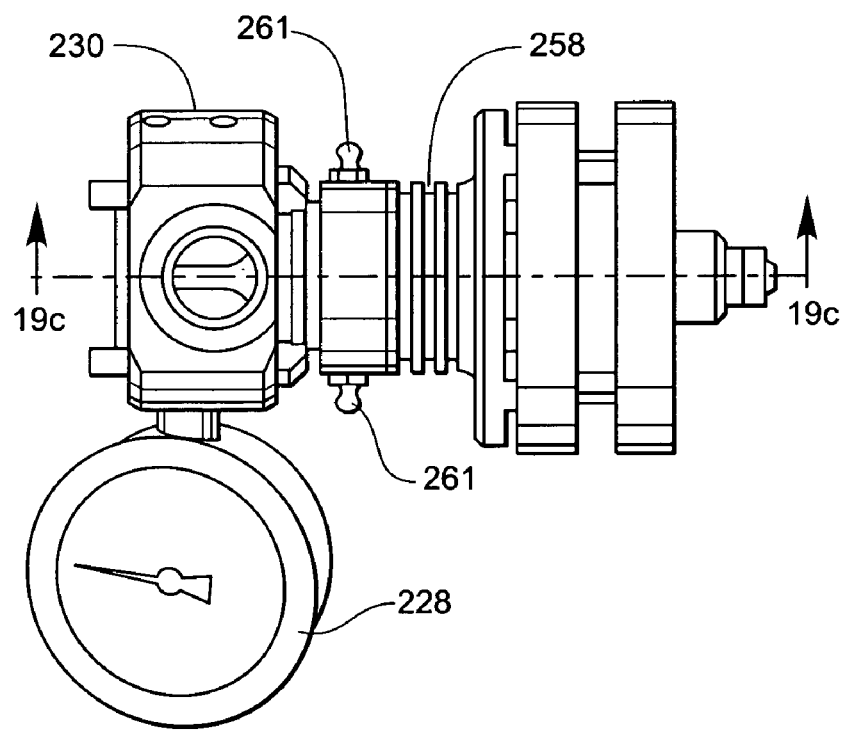
Figure 19C:
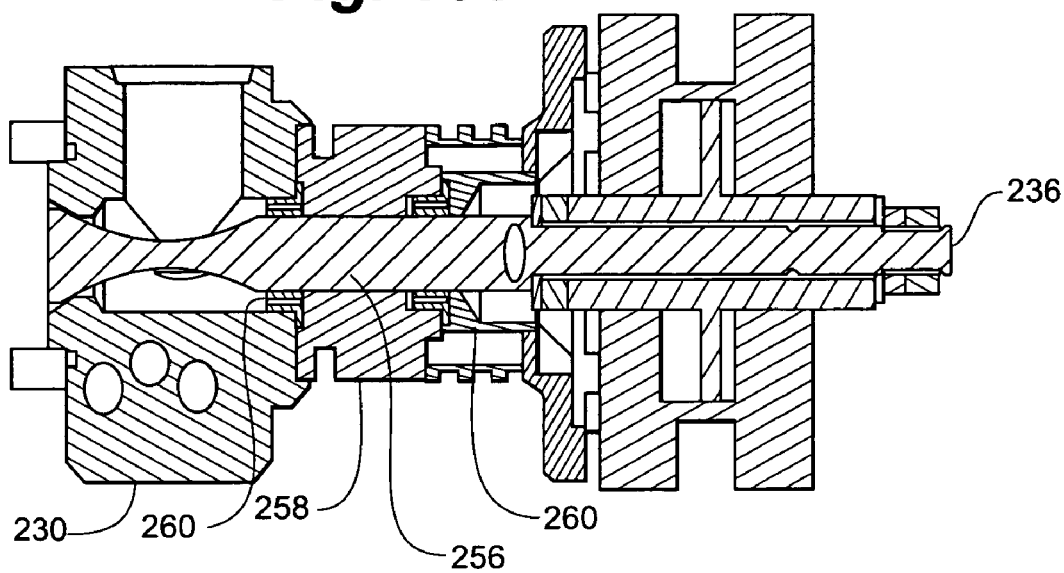
FIG. 19c is cross sectional view of the valve block taken along section line A—A in FIG. 19b.

Another aspect of poppet valve 230 is depicted in FIGS. 19a, 19b and 19c. Valve plunger 236 includes shaft 256. In this embodiment, where shaft 256 passes through housing 258, shaft 256 is surrounded at each end by seals 260. The space between seals 260 and surrounding shaft 256 is filled with grease. A zerk fitting 261 is in fluid communication with the grease filled chamber. Thus, the presence of grease helps resist the force of high pressure fluid tending to seep past shaft 256. In addition, when one of seals 260 begins to fail, viscous fluid will leak past seals 260 and begin to ooze from zerk fitting 261 thereby signaling that seals 260 are beginning to fail.

Referring again to FIG. 1 and to FIGS. 19a, 19b, and 19c, another aspect of the invention is depicted. As discussed above, more and more sealants used in industry are of the hot sealant variety. These sealants are heated for application and cool rapidly setting to their final consistency. The viscous liquid dispenser 20 of the present invention is adapted to accommodate these hot sealants. The viscous liquid dispenser 20 is structured by mass distribution to retain heat along the fluid path but to dissipate heat effectively in other areas where it is desirable to keep the viscous liquid dispenser 20 cool. For example, it is advantageous to dissipate heat effectively in areas where metering device 22 connects with pneumatic actuators, motors or gear boxes, which it is desirable to keep as cool as possible.

As seen in FIG. 1, metering device 22 is operably connected to servo motor 262 via gear box 264, and gear box coupling 266. Servo motor 262 and gear box 264 are generally conventional components. Gear box coupling 266, however, is particularly adapted to dissipate heat effectively.

Gear box coupling 266 generally includes first ring 268, second ring 270 and struts 272. First ring 268 is adapted for connection to gear box 264. Second ring 270 is adapted for connection to metering device 22. One skilled in the art will readily be able to envision a large number of ways of making these connections. But, conventionally these will be done with bolts and threaded holes. Struts 272 separate first ring 268 from second ring 270. This allows for free circulation of cooling air between first ring 268 and second ring 270. In addition, struts 272 are widely spaced to allow for air circulation. In addition, struts 272 substantially separate first ring 268 from second ring 270. Even further, struts 272 are perforated by multiple cooling holes 274. Cooling holes 274 serve to reduce the thermal mass of gear box coupling 266, to increase surface area and to allow additional air circulation in and around gear box coupling 266 to maximize cooling and thus dissipate heat rather than transmitting it to gear box 264 and servo motor 262 where it may cause harm to these components.

In another example, pneumatic actuator 234 is mounted to poppet valve 230 by valve cylinder mount 276. As can be seen in FIGS. 19 and 20, valve cylinder mount 276 separates pneumatic actuator 234 substantially from valve block 208. In addition, valve cylinder mount 276 may be pierced by cooling holes 278. To maximize the dissipation of heat energy before it reaches pneumatic actuator 234, potentially causing harm and increased likelihood of embodiment failure.

Further yet, valve block 208 and metering device body 26 are designed to be large unitary sold metal structures in order to maximize thermal mass in this area to maintain heat in the fluid flow path. Further yet, nozzle 102 may be formed from a highly conductive, high thermal mass material, such as brass, in order to maximize thermal mass and maximize heat retention while reducing or eliminating the need to have auxiliary heaters in these structures. In another embodiment of the viscous liquid dispenser 20, the viscous liquid dispenser 20 is supported in a floating head 280. The floating head 280 is able to float in three axes.

Figure 22:
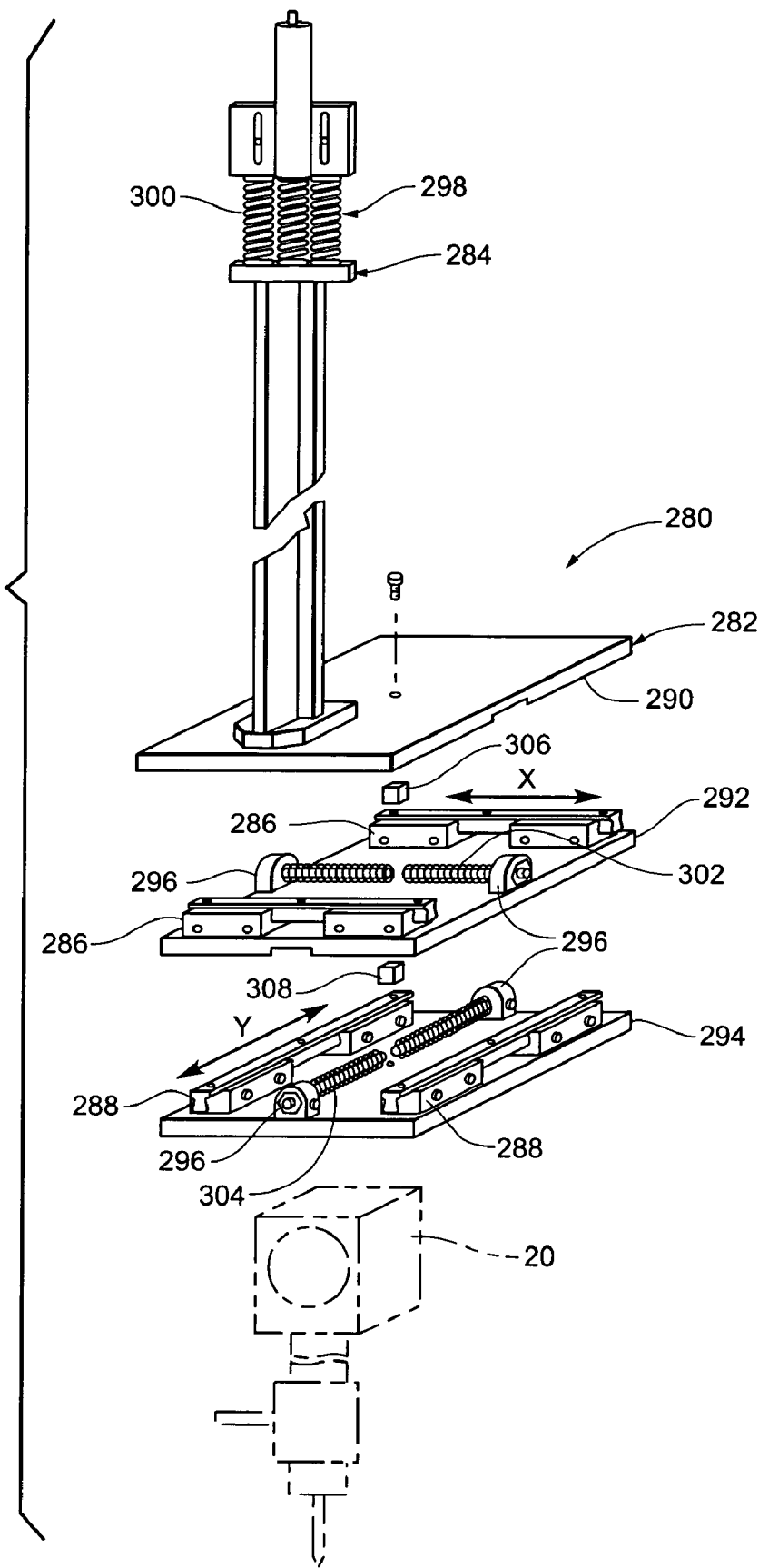
FIG. 22 is a schematic partially exploded view of a floating head assembly in accordance with the present invention.

Referring to FIG. 22 floating head 280 generally includes x-axis/y-axis mounting 282 and z-axis mounting 284.

X-axis/y-axis mounting 282 generally includes linear bearing members 286, 288 interleaved between stationary plate 290, x-plate 292 and y-plate 294 that allow limited movement of viscous liquid dispenser 20 in the x and y-axis direction. Linear bearing members 286 interconnect x-plate 292 to stationary plate 290 so that x-plate 292 has linear freedom of motion relative to stationary plate 290 along the x-axis x. Linear bearing members 288 interconnect y-plate 294 to x-plate 292 so that y-plate 292 has linear freedom of motion relative to x-plate 292 along the y-axis y.

X-axis/y-axis mounting further includes sensors 296. Sensors 296 are desirably linear proximity sensors such as photodetectors, whisker switches or encoders. Sensors 296 are triggered by the movement of viscous liquid dispenser 20 from a centered position relative to x-axis y-axis mounting 282. When sensors 296 are triggered by motion of viscous liquid dispenser 20 from a Zero position, sensors 296 trigger servo motors (not shown) to recenter viscous liquid dispenser 20 to a Zero position on the x-y axis.

Z-axis mounting 284 generally includes a biasing mechanism 298. Biasing mechanism 298 as depicted here includes springs 300 but may also include air springs or counterweights to compensate for the weight of floating head 280 and structures supported by floating head 280. The weight of the floating head 280 and viscous liquid dispenser 20 are balanced by springs 300, air springs or counterweights. The viscous liquid dispenser 20 is shock and bias loaded to a Zero position, which is a center position on the x and y axis. Sensors then sense x-y movement from the Zero point and direct servo motors to cause a readjustment of position to compensate for the drift of the Zero point. Shock and bias loading may be provided by springs 302, 304 bearing on blocks 306, 308 respectively.

The present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

What is claimed is:

1. A fouling resistant fluid dispensing assembly comprising:
   a metering device;
   a nozzle holder, the nozzle holder including a body defining a cylindrical bore, the bore having an axis;
   a nozzle having a cylindrical portion proportioned for close fitting coaxial insertion into the cylindrical bore;
   the nozzle holder being pierced by a passage oriented substantially perpendicular to the bore axis and passing through the cylindrical bore on a non-diametrical chord;
   the nozzle having a complementary passage alignable with the nozzle holder passage; and
   a retaining member proportioned to pass through the nozzle holder passage and the nozzle passage whereby the nozzle is retained in the cylindrical bore.

2. The fluid dispensing assembly as claimed in claim 1, further comprising a sealing member interposed between the nozzle and the nozzle holder.

3. The fluid dispensing assembly as claimed in claim 2 wherein the sealing member is an O-ring.

4. The fluid dispensing assembly as claimed in claim 3 wherein the O-ring is captured in a circumferential groove on the nozzle.

5. The fluid dispensing assembly as claimed in claim 3 wherein the O-ring is captured in a circumferential groove inside the cylindrical bore.

6. The fluid dispensing assembly as claimed in claim 1, wherein the retaining member is a pin.

7. The fluid dispensing assembly as claimed in claim 1, wherein the passage through the cylindrical bore is positioned substantially tangent to a wall of the cylindrical bore.

8. The fluid dispensing assembly as claimed in claim 1, wherein the retaining member, when inserted into the passage, fixes the nozzle in a repeatable rotational position.

9. The fluid dispensing assembly as claimed in claim 1, further comprising a floating head assembly operably supporting the fluid dispensing assembly.

10. The fluid dispensing assembly as claimed in claim 9, the floating head assembly comprising an z-axis mounting including biasing members counterbalancing the weight of the dispensing assembly; and an x-axis/y-axis mounting comprising a member operably connected to the z-axis mounting having limited freedom to move in plane generally perpendicular to the z-axis mounting about a zero point and further comprising sensors that are triggered when the member deviates from the zero point, the sensors being configured to send at least two signals to a servo such that the servo will move the floating head to a centered position at the zero point.

11. A method for retaining a nozzle in a fouling resistant nozzle holder, comprising the steps of:

coaxially inserting a nozzle having a cylindrical portion into a cylindrical cavity;

rotationally positioning the nozzle relative to the nozzle holder to rotationally align a nondiametrical chordwise passage through the nozzle holder with a complementary chordwise passage of the nozzle; and inserting a retaining member through the aligned holder passage and nozzle passage such that the retaining member secures the nozzle in the holder.

12. The method as claimed in claim 11, further comprising the step of interposing a sealing member between the nozzle and the nozzle holder.

13. The method as claimed in claim 11, further comprising the step of positioning the holder passage substantially tangent to a wall of the cylindrical cavity.

14. The method as claimed in claim 11, further comprising the step of capturing an O-ring in a circumferential groove on the nozzle.

15. The method as claimed in claim 11, further comprising the step of capturing an O-ring in a circumferential groove inside the cylindrical cavity.

16. A fouling resistant changeable nozzle assembly comprising:

a metering device;

means for holding a cylindrical nozzle;

a nozzle having a cylindrical portion proportioned for close fitting coaxial insertion into the holding means;

the holding means further comprising means for retaining the nozzle being pierced by a passage oriented substantially perpendicular to the bore axis and passing through the cylindrical bore on a non-diametrical chord;

the nozzle having a complementary passage alignable with the nozzle holder passage; and a retaining member proportioned to pass through the nozzle holder passage and the nozzle passage whereby the nozzle is retained in the cylindrical bore.

* * * * *